United States Patent Office 2,749,398
Patented June 5, 1956

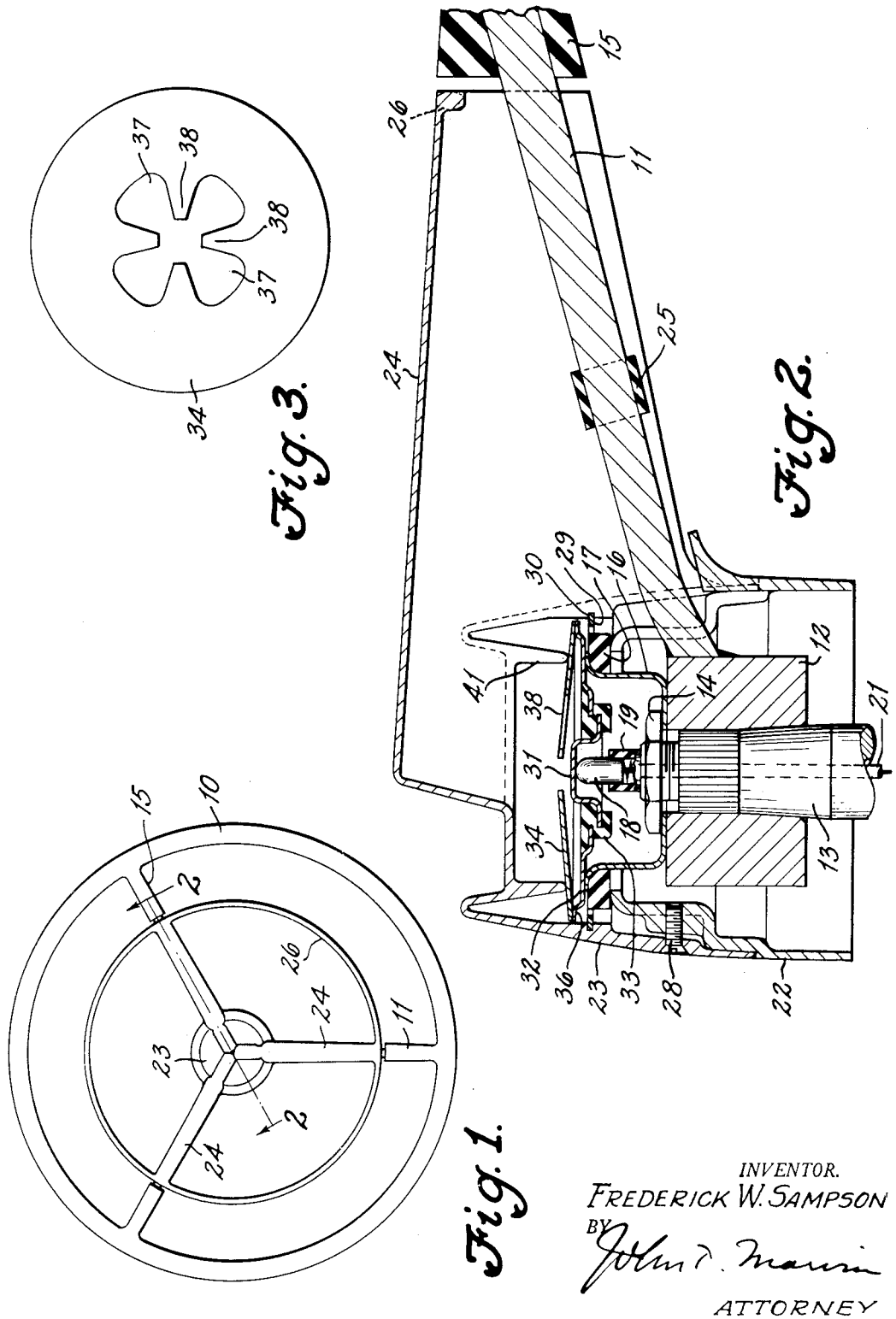

2,749,398

STEERING WHEEL SWITCH

Frederick W. Sampson, Dayton, Ohio, assignor to General Motors Corporation, Detroit, Mich., a corporation of Delaware Application September 13, 1954, Serial No. 455,525

2 Claims. (Cl. 200—61.56)

This invention relates to switches and more particularly to the construction and arrangement of a switch for use on the upper end of a steering column of an automobile or the like.

An object of the invention is to provide an improved horn blowing assembly on the steering mast of an automobile.

Another object of the invention is to provide a practical switch for a horn sounding ring on the steering column of an automobile which is simple in construction and of low manufacturing cost.

A further object of the invention is to provide within the cap-like hub portion formed integrally with a horn sounding ring on a steering column of an automobile a horn switch that is positive in action upon depressing the ring at any point about its periphery and which switch is of long life.

In carrying out the foregoing objects it is a still further and more specific object of the invention to detachably lock a horn switch having a snap acting spring contact therein wholly within a hollow cap-shaped integral hub portion of a horn blowing ring on a steering column of an automobile so that the switch is removable with the ring from the column as a unit for preventing parts of the switch from becoming separated from one another.

Further objects and advantages of the present invention will be apparent from the following description, reference being had to the accompanying drawings wherein a preferred form of the invention is clearly shown.

In the drawings:

Figure 1 is a plan view of a steering wheel and a horn button ring on the upper end of a steering mast or column of an automobile;

Figure 2 is an enlarged vertical sectional view taken on the line 2—2 of Figure 1 showing the mounting of a steering wheel on a steering shaft and the mounting of a horn button ring and horn switch on a steering column; and Figure 3 is a plan view of a disc-shaped snap acting spring contact employed in the horn switch shown in Figure 2.

Referring to the drawings there is shown in Figure 1 thereof a steering wheel 10 connected by spokes 11 to a hub 12 rigidly mounted on the upper end of a steering shaft 13 of a steering column or mast of an automobile or the like as by a nut 14 (see Figure 2). The one end of spokes 11 are welded or otherwise suitably secured to hub 12 and the other end is embedded in a molded plastic spoke portion 15 formed integral with wheel 10 (see Figure 2). A metal cup member 16, having an outwardly flared top and a thick insulating washer 17 located thereunder, is secured to shaft 13 prior to threading the nut 14 thereon. A spring pressed brush or terminal 18, mounted in a suitable insulating collar retainer 19, carried by shaft 13 has an electric wire connection 21, extending through a suitable bore in shaft 13, to a source of electric current and to a horn in or on the automobile. A die cast metal housing 22, provided with clearance openings for the spokes 11 of wheel 10, is adapted to be floatingly mounted upon the stationary part of the steering column (not shown) in any suitable or conventional manner. Washer 17 is retained between the flared top of cup member 16 and the top of housing 22. A combined horn button and horn sounding ring in the form of a die cast or the like member is also associated with the automobile steering column. This horn blowing member comprises a hollow cap-shaped hub portion 23, spokes 24 and a ring 26 all formed integrally with one another. The spokes 24 are hollowed out and form a cover over the spokes 11 of steering wheel 10 intermediate the hub 12 and the spoke portions 15 thereof. Hollow spokes 24 are maintained in spaced relation to the spokes 11 by a resilient rubber-like collar member 25 placed on and surrounding spokes 11 and these members 25 prevent the spokes 24 from contacting spokes 11 and setting up a vibratory noise. The horn blowing member is secured to the floatingly mounted housing 22 by a plurality of screws 28. A horn switch is disposed in the hollow cap-shaped hub 23 and is locked therein by a split expandible ring 29 expanded into a groove 30 provided in the inner wall surface of the hub 23. This horn switch includes a central inverted stationary cup contact 31 supported from a shallow circular cup element 32 by a molded plastic insulating member 33 which bonds the contact 31 to element 32 to form a unitary structure. The horn switch also includes a substantially flat circular steel spring snap acting contact disc 34 having its periphery edge resting on a raised outwardly flanged top portion 36 of the cup element 32. This spring contact 34 has its central portion cut away as at 37 to provide a plurality of fingers 38 (see Figure 3). Spring contact 34 has an action similar to a snap acting diaphragm or similar to the bottom of an oil can and such snap acting spring steel contact discs are known to those skilled in the art. When the switch is locked in the cap-shaped hub 23 it is centrally located therein and is movable between the split ring 29 and an inner depending collar 41 formed integrally with cap hub 23. However after cap hub 23 is secured to floating housing 22 the spring contact 34 biasingly engages the underside of collar 41 by being wedged between the collar 41 and flange 36 on the cup element 32 (see Figure 2). The spring contact 34 is electrically grounded through cap-shaped hub 23 or through cup element 32, cup member 16, wheel hub 12 and steering shaft 13 and is adapted to complete an electric circuit to the horn for energizing same when its fingers 38 engage contact 31.

In order to assemble the structure housing 22 is first placed on a suitable floating mount carried at the upper end of the stationary part of a steering column. Steering wheel hub 12 is then inserted over the upper end of shaft 13. Washer 17 is slipped over walls of cup member 16 and this cup member is inserted over the upper end of shaft 13. Nut 14 is thereafter threaded to shaft 13 to mount hub 12 of wheel 10, cup member 16, washer 17 and housing 22 upon the steering column. Then the cap-shaped hub 23 of the horn blowing button and ring member together with the switch locked therein, by split ring 29, is placed over housing 22 and secured thereto by the screws 28. The cap-shaped hub 23 forms a closure for the upper end of the steering column.

Referring to Figure 2 it will be noted that a downward force applied at any point around the ring 26 of the combined horn blowing button and ring member will tilt or wobble both the cap-shaped hub 23 and housing 22 on the floating mount of housing 22 and will depress collar 41 of cap hub 23 against the spring 34 to cause this spring contact to snap and move the fingers 38 thereon into engagement with the stationary contact 31 of the horn switch. Since contact 31 is at all times in engagement with the brush or terminal 18 an electric circuit is thus completed to the horn to energize and sound same. As soon as the force is relieved from the horn blowing ring 26 the spring tension in the disc contact 34 elevates the cap hub 23 and permits this spring contact 34 to snap into its normal cap biasing position, as is shown in Figure 2 of the drawings, whereupon fingers 38 disengage contact 31 to break the circuit to the horn. While contact 31 is stationary with respect to up and down movement it is to be understood that it as well as other parts of the structure disclosed are rotatable by and along with turning of the steering wheel.

From the foregoing it should be apparent that an improved steering wheel horn sounding switch assemblage of the type employing a disc-like spring contact is provided. The improved horn switch assemblage is compact and of low manufacturing costs. By locating the horn switch wholly within the cap-shaped hub portion of the combined horn button and ring and locking the same therein parts of the switch are maintained in their proper operating position at all times and assembly of the switch and the horn button and ring as a unit to the steering column is simplified. The locking of the switch parts together within the cap-shaped hub of the steering button and ring also prevents these parts from becoming segregated when it is necessary to dismantle the steering wheel assemblage.

While the form of embodiment of the invention as herein disclosed constitutes a preferred form, it is to be understood that other forms might be adopted as may come within the scope of the claims which follow.

What is claimed is as follows:

1. In combination, a steering column of an automobile including a hollow shaft therein, a steering wheel having a hub portion fitting over the upper end of said shaft, a switch supporting cup member also fitting over the upper end of the shaft of said column, means for locking said steering wheel and said cup member to the upper end of said shaft for rotation therewith, a spring pressed terminal above the hub of said wheel within said cup member and having an electrical connection through said hollow shaft with a horn, a horn sounding ring having an integral hollow cap-shaped hub portion above said column and closing the upper end thereof, a switch within the hollow cap-shaped hub portion of said ring above said cup member, said switch including a stationary contact and a snap acting spring contact, said stationary contact being supported upon said cup member and engaging said terminal, said spring contact being insulated from said stationary contact and disposed between the same and a part of the cap-shaped hub portion of said ring, means for securing the hub portion of said ring to said column, said last named means being detachable from said column to permit said ring to be removed therefrom without unlocking said steering wheel from said shaft, said spring contact being snapped into engagement with said stationary contact upon depressing said cap-shaped hub portion of said ring to complete an electric circuit to the horn, and means for retaining both of said contacts within the hollow cap-shaped hub portion of said ring upon removal of the ring from said column to separate said switch as a unit from said terminal.

2. In combination, a steering column of an automobile including a hollow shaft therein, a steering wheel having a hub portion fitting over the upper end of said shaft, a switch supporting cup member also fitting over the upper end of the shaft of said column, means for locking said steering wheel and said cup member to the upper end of said shaft for rotation therewith, a spring pressed terminal above the hub of said wheel within said cup member and having an electrical connection through said hollow shaft with a horn, a horn sounding ring having an integral hollow cap-shaped hub portion above said column and closing the upper end thereof, a switch within the hollow cap-shaped hub portion of said ring above said cup member, said switch including a stationary unitary structure comprising an inverted cupped contact engaging said terminal, a cup element supported on said cup member and a member insulating said cupped contact from said cup element, said switch also including a snap acting spring contact disc having its peripheral edge resting on the cup element of said unitary structure and being engageable by a part of the cup-shaped hub portion of said ring, means for securing the hub portion of said ring to said column, said last named means being detachable from said column to permit said ring to be removed therefrom without unlocking said steering wheel from said shaft, said spring contact disc being snapped into engagement with the cupped contact of said stationary unitary structure upon depressing said cap-shaped hub portion of said ring to complete an electric circuit to the horn, and a split ring expanded into a groove in a wall of the hollow cap-shaped hub portion of said ring for retaining both of said contacts within the hub portion of said ring upon removal of the ring from said column to separate said switch as a unit from said terminal.

References Cited in the file of this patent

UNITED STATES PATENTS

| | | |
|---|---|---|
| 2,119,752 | Pulleybank | June 7, 1938 |
| 2,237,055 | Little | Apr. 1, 1941 |
| 2,555,510 | Sampson | June 5, 1951 |

FOREIGN PATENTS

| | | |
|---|---|---|
| 262,708 | Great Britain | Jan. 6, 1927 |